No. 843,581. PATENTED FEB. 12, 1907.
C. J. CALEY.
HINGE.
APPLICATION FILED MAY 24, 1906.
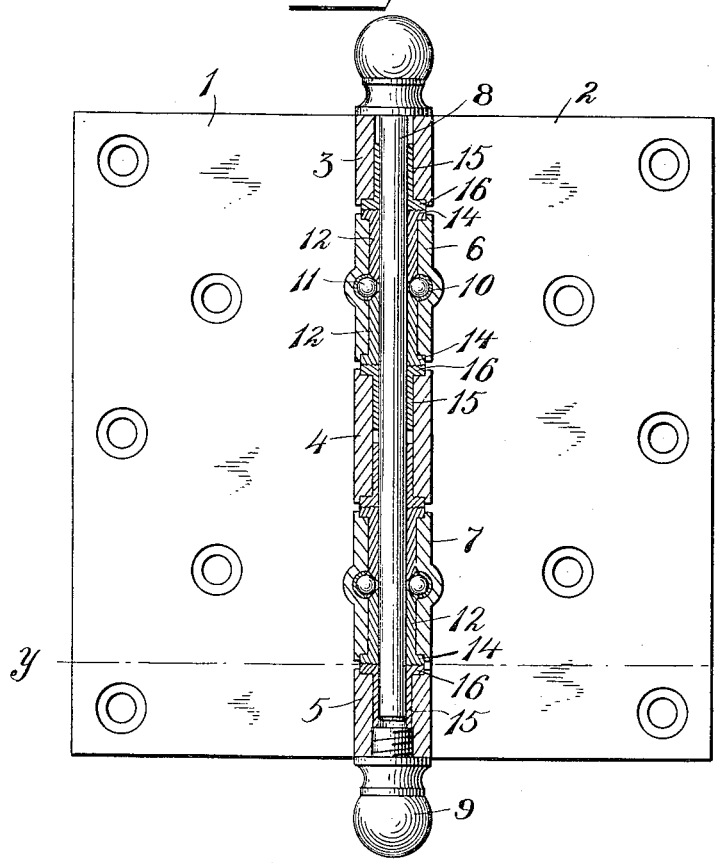
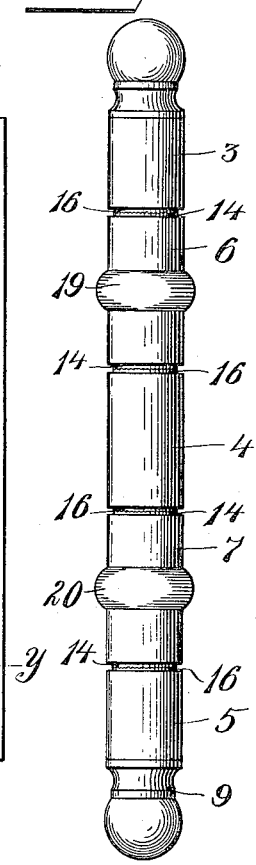
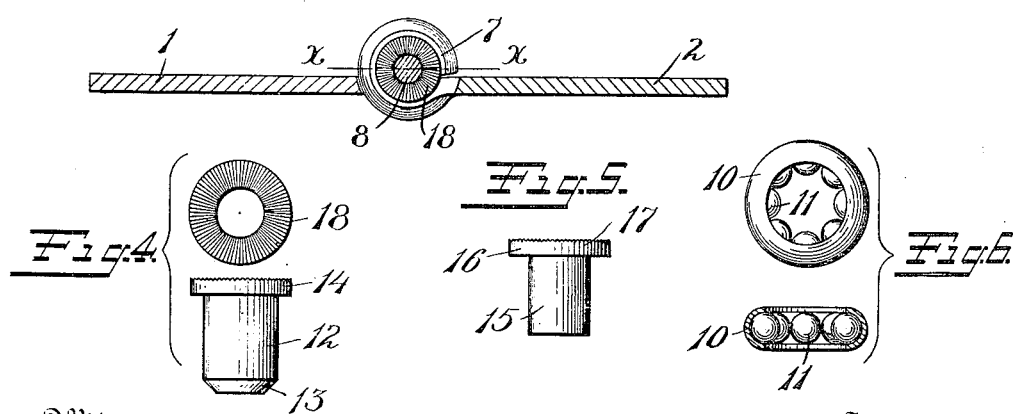
Witnesses
Inventor
C. J. Caley
By his Attorneys

UNITED STATES PATENT OFFICE.

CHARLES J. CALEY, OF NEW BRITAIN, CONNECTICUT, ASSIGNOR TO RUSSELL & ERWIN MANUFACTURING COMPANY, OF NEW BRITAIN, CONNECTICUT.

HINGE.

No 843,581.     Specification of Letters Patent.     Patented Feb. 12, 1907.

Application filed May 24, 1906. Serial No. 318,454.

*To all whom it may concern:*

Be it known that I, CHARLES J. CALEY, a citizen of the United States, residing at New Britain, Hartford county, State of Connecticut, have invented certain new and useful Improvements in Hinges, of which the following is a full, clear, and exact description.

My invention relates to improvements in hinges, and particularly a construction providing antifriction-bearings.

The principal object of my invention is to provide a construction of this character having great strength and supporting power and producing as little friction as possible.

My further object is to conceal the antifriction-bearings and house them in such a way that they cannot become accidentally lost when the parts of the hinge are separated.

My invention consists in improvements the principles of which are illustrated in the accompanying single sheet of drawings.

Briefly, it comprises the use of a series of balls or similar devices preferably held in a hardened raceway housed in one or more of the knuckles of the hinge and cone-bearing members coacting with the balls, additional bearing devices carried by the non-ball-bearing knuckles coacting with the cone-bearing members for securing additional lateral support and transmitting the weight of the moving leaf and its supported door or other device.

Figure 1 is a front view in section of a hinge embodying the improvements of my invention, section being taken on the plane of the line *x x* of the Fig. 3. Fig. 2 is a back view of the device with the leaves folded together. Fig. 3 is a horizontal section on a plane of the line *y y*, Fig. 1, looking upward. Fig. 4 shows detailed plan and side views of one of the cone-bearing members. Fig. 5 is a side view of one of the bearing members, which coact with the cone-bearing members. Fig. 6 shows detailed plan and transveres section of the ball-bearings and raceway therefor.

The leaves 1 and 2 are preferably constructed of sheet or wrought metal and provided, respectively, with the knuckles 3, 4, 5, 6, and 7, which interlock with one another and are held together by a pintle 8. The terminal button 9 is also preferably employed, as is customary.

10 is a hardened-steel raceway for a series of balls, such as 11. One or more of the knuckles in the process of manufacture are provided with grooves. One of the raceways and the contained balls is placed in each groove as the knuckle is being rolled up into the completed cylindrical form. This holds the raceway and balls securely in place, so that there is no danger of the possible dropping out when the two leaves of the hinge are separated.

12 is a cone-bearing member, preferably of hardened steel and having a cylindrical body portion provided with a tapered bearing end 13 and the flange 14. A pair of these cone-bearing members is placed in each of the ball-bearing knuckles, the conical ends engaging the balls. Each end of each ball-bearing knuckle is preferably recessed to receive the flange 14, so as to produce a nearly-flush joint. The drawings in this respect are diagrammatic, the spaces between the knuckles being exaggerated and much greater than the spaces in an actual hinge. The ends of the bearing members, however, do actually protrude slightly beyond the ends of the knuckles.

In each of the non-ball-bearing knuckles is mounted a bearing member or plug 15, having a flange 16 seated in the recess of the knuckle. These bearing-plugs are provided opposite each of the cone-bearing members, and the faces of the adjacent bearing members are preferably roughened or provided with grooves or teeth, such as 17 and 18, for causing them to interlock and distributing the pressure more uniformly.

In a hinge of this class the leaves and knuckles are usually made of brass; but all the bearing members are of hardened steel and are made in parts for the purpose of assembling. The plugs 15 are secured immovably in the knuckles 3, 4, and 5, and the roughened flanges coact with the corresponding roughened flanges of the cone-bearing members 12 in the ball-bearing knuckles to prevent the said bearing members from rotating. As the leaf 2 is rotated the ball-bearing knuckles 6 and 7, carried thereby, rotate upon the stationary cone-bearing members 12.

It is obvious that the invention is applicable to hinges irrespective to the number of knuckles. It is also possible to attain many of the advantages of the invention without the use of the separate raceways 10, since in some cases the housing-groove of the knuckle may serve to retain the balls. While I have shown the ball-bearing knuckles to have several grooves formed by rolling and pressing the metal outward on the side opposite the groove, it is obvious that the groove may be formed in any convenient manner and that the knuckle may be plain on its exterior instead of provided with the slight enlargements 19 20. I prefer to employ the construction shown, since in that way greater strength is provided.

What I claim is—

1. A hinge, having interlocking knuckles, a series of balls carried in one of the knuckles, and oppositely-faced cone-bearing members located in said knuckles, and coacting with the balls and also coacting at the outer ends with the adjacent knuckles.

2. A hinge comprising leaves having interlocking knuckles, a series of antifriction devices housed within one of said knuckles and bearing members carried by the same knuckle each coacting with the antifriction device and each bearing member also coacting with the adjacent knuckle.

3. A hinge comprising leaves having interlocking knuckles, antifriction-bearings carried within one of said knuckles, bearing members carried by the same knuckle coacting with the said antifriction devices and said bearing members projecting beyond the ends of the knuckle and coacting bearing members carried by the adjacent knuckles.

4. A hinge comprising leaves having knuckles, one of said knuckles having a groove around a central passage, a series of antifriction devices located in said groove and oppositely-faced bearing members coacting with said antifriction devices, projecting beyond the opposite ends of said knuckle and being removable independently of said antifriction devices.

5. A hinge comprising leaves having knuckles one of said knuckles having a groove, a ball-race with balls mounted in said groove and bearing members coacting with said balls and protruding slightly beyond the opposite ends of said knuckle.

6. A hinge comprising leaves having interlocking knuckles, a pintle connecting said knuckles antifriction devices located in one of said knuckles, bearing members coacting with said antifriction devices and extending beyond the opposite ends of said knuckles and bearing members carried by adjacent knuckles and projecting slightly beyond the ends thereof and engaging said first-named bearing members.

7. A hinge comprising leaves having interlocking knuckles, a pintle connecting said knuckles, antifriction devices located in one of said knuckles, bearing members coacting with said antifriction devices and extending beyond the ends of said knuckles and bearing members carried by adjacent knuckles and projecting slightly beyond the ends thereof, the coacting faces of the adjacent bearing members being roughened.

CHAS. J. CALEY.

Witnesses:
M. S. WIARD,
CHAS. E. RUSSELL.